(12) United States Patent
Wang (10) Patent No.: US 11,885,423 B2
(45) Date of Patent: Jan. 30, 2024

(54) AIR INFLATION DEVICE HAVING ROTATABLE PRESSURE GAUGE

(71) Applicant: BETO ENGINEERING AND MARKETING CO., LTD., Taichung (TW)

(72) Inventor: Lopin Wang, Taichung (TW)

(73) Assignee: BETO ENGINEERING AND MARKETING CO., LTD., Taichung (TW)

( * ) Notice: Subject to any disclaimer, the term of this patent is extended or adjusted under 35 U.S.C. 154(b) by 516 days.

(21) Appl. No.: 17/158,432

(22) Filed: Jan. 26, 2021

(65) Prior Publication Data
US 2021/0239228 A1    Aug. 5, 2021

(30) Foreign Application Priority Data
Jan. 31, 2020   (TW) .................. 109103063

(51) Int. Cl.
*F04B 33/00* (2006.01)
*F16K 15/20* (2006.01)
*G01L 19/16* (2006.01)
*G01L 19/00* (2006.01)

(52) U.S. Cl.
CPC .......... *F16K 15/20* (2013.01); *G01L 19/0007* (2013.01); *G01L 19/16* (2013.01)

(58) Field of Classification Search
CPC ............ F04B 33/00–02; F04B 53/1065; F04B 53/1075; F04B 51/00; F04B 39/123; F16K 15/08; F16K 15/145; F16K 15/1472; F16K 15/148; G01L 7/022; G01L 19/0007; G01L 19/14

USPC ............................................. 73/756
See application file for complete search history.

(56) References Cited

U.S. PATENT DOCUMENTS

| | | | | |
|---|---|---|---|---|
| 5,964,577 A | * | 10/1999 | Chuang | F04B 33/005 417/63 |
| 6,079,954 A | * | 6/2000 | Kownacki | A63H 27/14 446/212 |
| 6,485,264 B1 | * | 11/2002 | Wu | F04B 33/005 417/63 |
| 6,558,129 B2 | * | 5/2003 | Wang | F04B 33/005 417/63 |
| 6,736,619 B2 | * | 5/2004 | Wu | F04B 33/005 417/313 |

(Continued)

FOREIGN PATENT DOCUMENTS

DE     102017110837 B3 *   9/2018
TW         M594066 U *   4/2021  .............. F04B 33/00

*Primary Examiner* — Thomas Fink
(74) *Attorney, Agent, or Firm* — DLA PIPER LLP (US); Blake W. Jackson (57) ABSTRACT

An air inflation device includes an inflation unit having an air outlet channel extending along a first axis, and an insertion channel extending along a second axis transverse to the first axis and partially communicating with the air outlet channel. A pressure gauge unit is rotatably mounted on the inflation unit and includes a pressure gauge, and a shaft extending outwardly from the pressure gauge and inserted into the air outlet channel. The shaft has an annular groove formed in an outer peripheral surface thereof and corresponding to and communicating with the insertion channel. An air guide unit includes a manifold inserted into the insertion channel and engaging the annular groove.

13 Claims, 7 Drawing Sheets

(56) References Cited

U.S. PATENT DOCUMENTS

| | | | | |
|---|---|---|---|---|
| 7,661,934 B2* | 2/2010 | Huang | F04B 33/005 | 417/440 |
| 8,356,984 B2* | 1/2013 | Wang | F04B 33/005 | 417/63 |
| 8,747,076 B2* | 6/2014 | Wang | F04B 33/005 | 417/63 |
| 9,239,046 B2* | 1/2016 | Wang | F04B 33/005 | |
| 9,255,571 B2* | 2/2016 | Wang | F04B 9/06 | |
| 9,945,367 B2* | 4/2018 | Wang | F04B 33/005 | |
| 2003/0194329 A1* | 10/2003 | Wu | F04B 33/005 | 417/63 |
| 2004/0001761 A1* | 1/2004 | Wu | F04B 33/005 | 417/63 |
| 2004/0045605 A1* | 3/2004 | Floh | F16K 7/075 | 137/512.15 |
| 2004/0086404 A1* | 5/2004 | Wu | F04B 33/005 | 417/440 |
| 2004/0156726 A1* | 8/2004 | Wu | F04B 33/005 | 417/469 |
| 2005/0106050 A1* | 5/2005 | Hunt | F04B 33/00 | 417/440 |
| 2010/0098557 A1* | 4/2010 | Sanders | F04B 33/00 | 417/440 |
| 2010/0104453 A1* | 4/2010 | Wu | F04B 33/005 | 417/63 |
| 2011/0091339 A1* | 4/2011 | Huang | F04B 33/005 | 417/437 |
| 2012/0186355 A1* | 7/2012 | Wang | F04B 33/005 | 73/744 |
| 2013/0071264 A1* | 3/2013 | Wang | F04B 33/005 | 417/234 |
| 2015/0167656 A1* | 6/2015 | Wang | F04B 33/005 | 417/63 |
| 2016/0010637 A1* | 1/2016 | Chuang | F04B 33/00 | 417/63 |
| 2016/0231185 A1* | 8/2016 | Wu | F04B 53/14 | |
| 2016/0312772 A1* | 10/2016 | Chuang | F04B 33/005 | |
| 2017/0261007 A1* | 9/2017 | Wang | F04B 33/005 | |
| 2018/0119684 A1* | 5/2018 | Winefordner | F04B 37/12 | |
| 2019/0128255 A1* | 5/2019 | Wang | F04B 53/10 | |

* cited by examiner

AIR INFLATION DEVICE HAVING ROTATABLE PRESSURE GAUGE

CROSS-REFERENCE TO RELATED APPLICATION

This application claims priority of Taiwanese Patent Application No. 109103063, filed on Jan. 31, 2020.

FIELD

The disclosure relates to an air inflation device that has a rotatable pressure gauge.

BACKGROUND

There are many types of air inflation devices currently on the market. A conventional air inflation device generally includes a main body, a pressure gauge, and an air guide tube. The main body has a bottom seat, a cylinder extending upwardly from the bottom seat, and a piston rod movably disposed up and down in the cylinder. The bottom seat defines an air outlet channel communicating with the cylinder. The piston rod is moved downward to compress air in the cylinder and generate a high pressure air that flows into the air outlet channel. The pressure gauge communicates with the air outlet channel for measuring the pressure of the high pressure air. The air guide tube communicates with the air outlet channel for guiding the high pressure air to flow out therefrom.

Since the pressure gauge is threadedly connected to the bottom seat, it can be rotated relative to the bottom seat so as to change its angle. However, not only the positioning of the pressure gauge cannot be ensured, but also the pressure gauge is prone to loosen from the bottom seat under long term use. There is still room for improvement of the conventional air inflation device.

SUMMARY

Therefore, an object of the present disclosure is to provide an air inflation device that can alleviate at least one of the drawbacks of the prior art.

According to the present disclosure, an air inflation device comprises an inflation unit, a pressure gauge unit and an air guide unit. The inflation unit has an air outlet channel extending along a first axis, and an insertion channel extending along a second axis transverse to the first axis and partially communicating with the air outlet channel. The pressure gauge unit is rotatably mounted on the inflation unit and includes a pressure gauge, and a shaft extending outwardly from the pressure gauge and inserted into the air outlet channel. The shaft has an annular groove formed in an outer peripheral surface thereof and corresponding to and communicating with the insertion channel. The air guide unit includes a manifold inserted into the insertion channel and engaging the annular groove.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Before the present disclosure is described in greater detail with reference to the accompanying embodiments, it should be noted herein that like elements are denoted by the same reference numerals throughout the disclosure.

Figure 1:
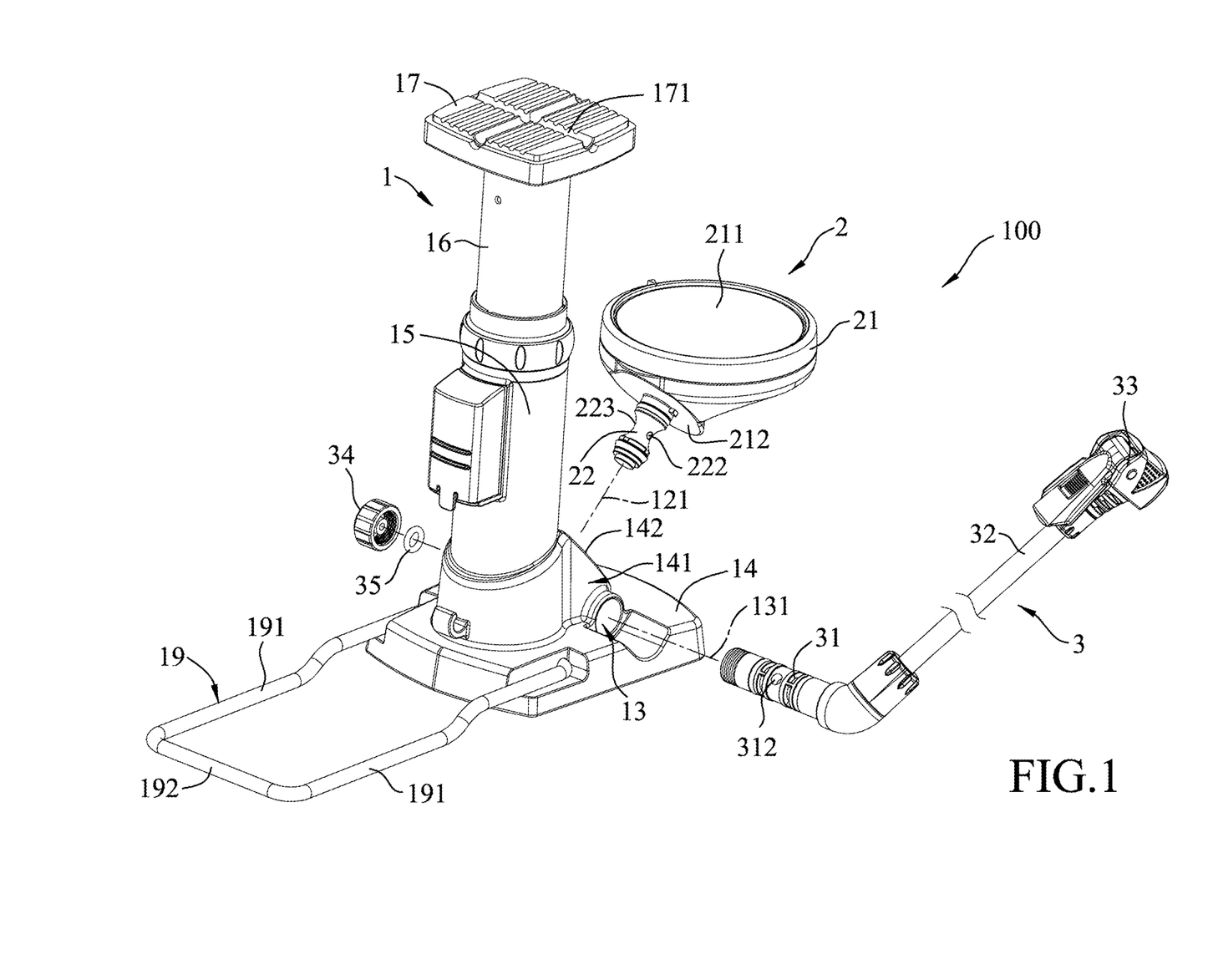
FIG. 1 is a partly exploded perspective view of an air inflation device according to the first embodiment of the present disclosure.
Figure 2:
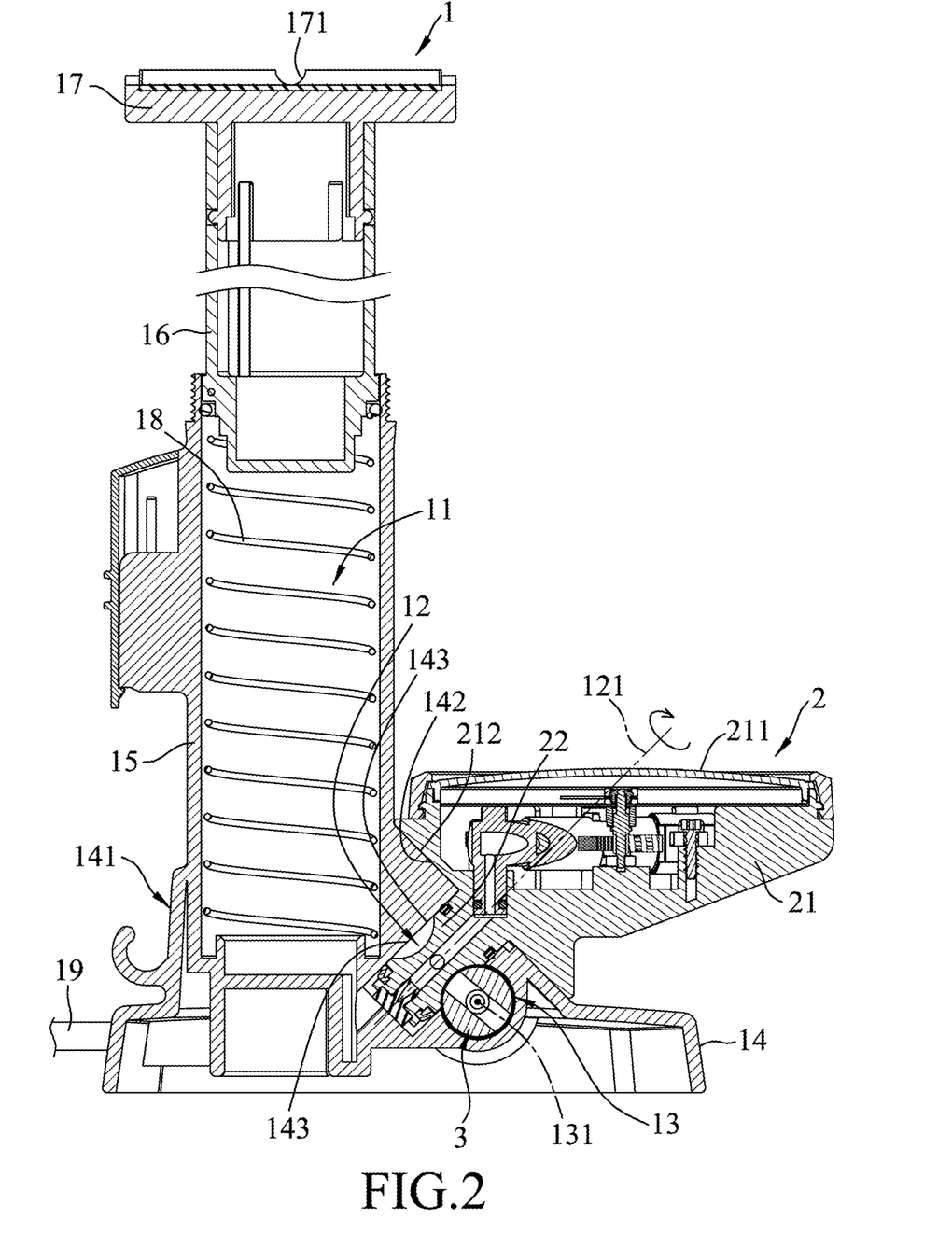
FIG. 2 is an assembled sectional view of the first embodiment.
Figure 3:
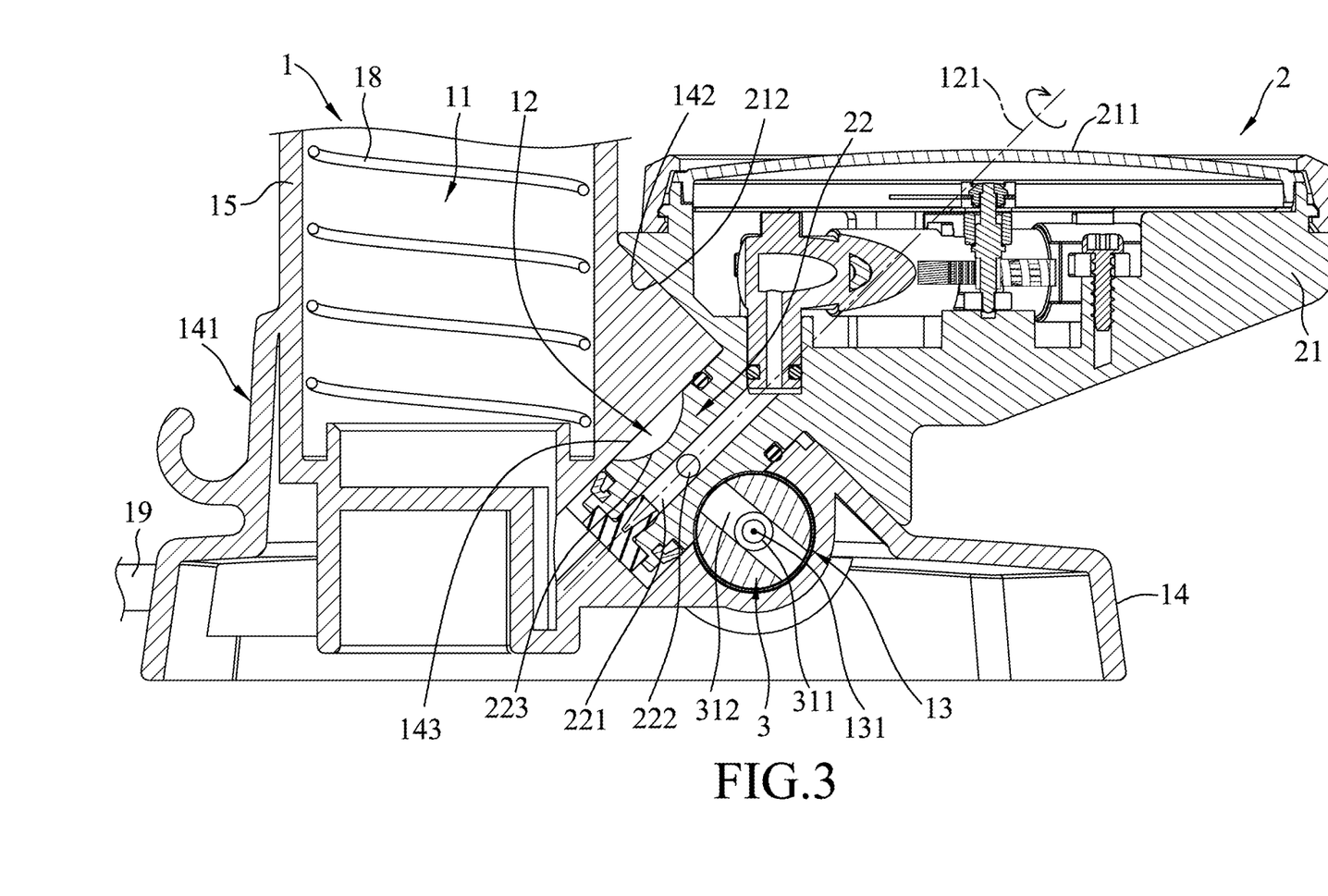
FIG. 3 is an enlarged view of a portion of FIG. 2.

Referring to FIGS. 1 to 3, an air inflation device 100 according to the first embodiment of the present disclosure includes an inflation unit 1, a pressure gauge unit 2, and an air guide unit 3.

The inflation unit 1 has a chamber 11, in which air can be compressed to generate a high pressure air, an air outlet channel 12 extending along a first axis 121 and communicating with the chamber 11, and an insertion channel 13 extending along a second axis 131 transverse to the first axis 121 and partially communicating with the air outlet channel 12.

In this embodiment, the inflation unit 1 is foot-operated, and includes a bottom seat 14, a cylinder 15 extending upwardly from the bottom seat 14 and defining the chamber 11, a piston rod 16 movably disposed up and down in the chamber 11, a pedal plate 17, an elastic member 18, and an auxiliary member 19. The bottom seat 14 has a protruding portion 141 extending upwardly from a top surface thereof and surrounding a bottom portion of the cylinder 15. The protruding portion 141 has a first inclined surface 142 located on one side of the bottom seat 14 and facing away from the cylinder 15. The first inclined surface 142 gradually extends downwardly and obliquely from a side close to the cylinder 15 to a side distal to the cylinder 15, is perpendicular to the first axis 121, and forms an angle of 45° with the cylinder 15. The air outlet channel 12 extends inwardly from the first inclined surface 142 along the first axis 121, and is defined by a channel surface 143.

The pedal plate 17 is disposed on a top end of the piston rod 16 for being stepped on to press down the piston rod 16. The pedal plate 17 has an engaging groove 171 formed in a top surface thereof. The elastic member 18 is a compression spring that is disposed in the chamber 11 between a bottom end of the cylinder 15 and a bottom end of the piston rod 16 and that can generate a restoring force for driving the piston rod 16 to restore to its original position after being pressed downward. The auxiliary member 19 has a U-shaped frame that is rotatably mounted on a side of the bottom seat 14 opposite to the first inclined surface 142 and that includes two spaced-apart lateral rods 191 having one ends pivotally connected to the bottom seat 14, and a connecting rod 192 connected between the other ends of the lateral rods 191 that are distal to the bottom seat 14. The auxiliary member 19 is opposite to the pedal plate 17 in a top-bottom direction, and is opposite to the first inclined surface 142 along a transverse direction transverse to the top-bottom direction.

The pressure gauge unit 2 is rotatably mounted on the first inclined surface 142, and includes a pressure gauge 21 and a shaft 22. The pressure gauge 21 has a gauge surface 211, and a second inclined surface 212 rotatably abutting against the first inclined surface 142. The second inclined surface 212 is perpendicular to the first axis 121, has a slope similar to that of the first inclined surface 142, and forms an angle of 45° with the gauge surface 211. As for the internal structure of the pressure gauge 21 and the operating principle for measuring the high pressure air, since they are known in the art and are not an important aspect of this disclosure, a detailed description thereof will be omitted herein for the sake of brevity.

The shaft 22 extends outwardly and obliquely from the second inclined surface 212 along the axis 121, and is rotatably inserted into the air outlet channel 12. The shaft 22 is in frictional contact with the channel surface 143, and has an axial hole 221 extending along the first axis 121, an annular groove 223 formed in an outer peripheral surface thereof, and an aperture 222 formed through a base of the annular groove 223 and transverse to and communicating with the axial hole 221. The axial hole 221 extends from a distal end of the shaft 22 that is distal to the pressure gauge 21 to a proximal end of the shaft 22 that is connected to the second inclined surface 212. The annular groove 223 communicates with the aperture 222 and the insertion channel 13.

The air guide unit 3 is connected to the inflation unit 1 for guiding the high pressure air to flow out of the air outlet channel 12, and includes a manifold 31 inserted into the insertion channel 13 and engaging the annular groove 223, a soft tube 32 connected to an end of the manifold 31 that is distal to the insertion channel 13 and extending outwardly therefrom, an inflation head 33 mounted on an end of the soft tube 32 that is distal to the manifold 31 for ejection of the high pressure air, a cap 34 removably connected to an end of the manifold 31 that is distal to the soft tube 32, and a seal member 35 disposed between the manifold 31 and the cap 34. The manifold 31 has a manifold axial hole 311 extending along the second axis 131 from the end of the manifold 31 that is distal to the soft tube 32 to the end of the manifold 31 that is connected to the soft tube 32, and a perforation 312 extending transversely from the manifold axial hole 311 to an outer peripheral surface thereof and corresponding to and communicating with the annular groove 223.

It is worth to mention herein that the annular groove 223 of the shaft 22 has a concave cross section, the insertion channel 13 has a circular cross section, and the manifold 31 is a round tube partially engaging the annular groove 223. During assembly, the shaft 22 is first inserted into the air outlet channel 12, after which the manifold 31 is inserted into the insertion channel 13 at one end thereof, and the cap 34 is threadedly connected to the manifold 31 at the other end of the insertion channel 13, so that the manifold 31 cannot be detached from the insertion channel 13 and is positioned therein. Simultaneously, with the outer peripheral surface of the manifold 31 partially embedded in the annular groove 223 to limit the shaft 22, the shaft 22 cannot be detached from the air outlet channel 12, but can rotate relative to the channel surface 143 about the first axis 121.

Figure 4:
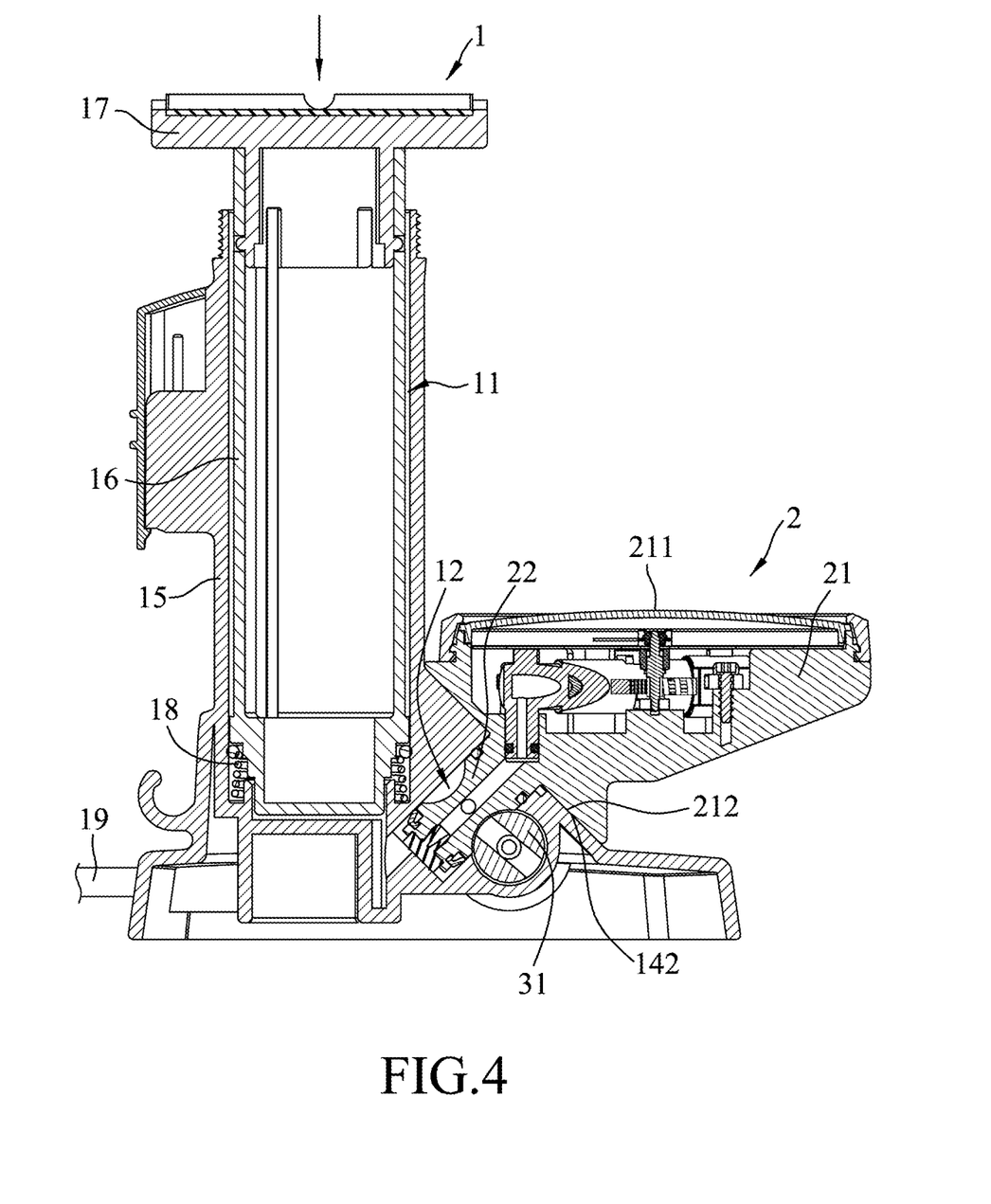
FIG. 4 is a view similar to FIG. 2, but illustrating an inflation unit in an inflating state.

To use the air inflation device 100 of this disclosure, the auxiliary member 19 is first rotated relative to the bottom seat 14 away from the cylinder 15 so as to be placed on the ground, after which one foot of a user is stepped on the auxiliary member 19 to position the same on the ground, while the other foot of the user is stepped on the pedal plate 17. As the other foot of the user exerts force to press down the pedal plate 17, the piston rod 16 is pushed down, as shown in FIG. 4, and air in the chamber 11 is compressed into high pressure air. The high pressure air then flows forward into the air outlet channel 12, flows through the shaft 22, and into the pressure gauge 21. At the same time, the high pressure air will also flow from the manifold 31 to the soft tube 32 and discharge through the inflation head 33. Afterwards, when the other foot of the user does not apply force to the pedal plate 17, the piston rod 16 is moved upward through the restoring force of the elastic member 18 to restore to its original position, as shown in FIG. 2, for the next air inflation operation.

Figure 5:
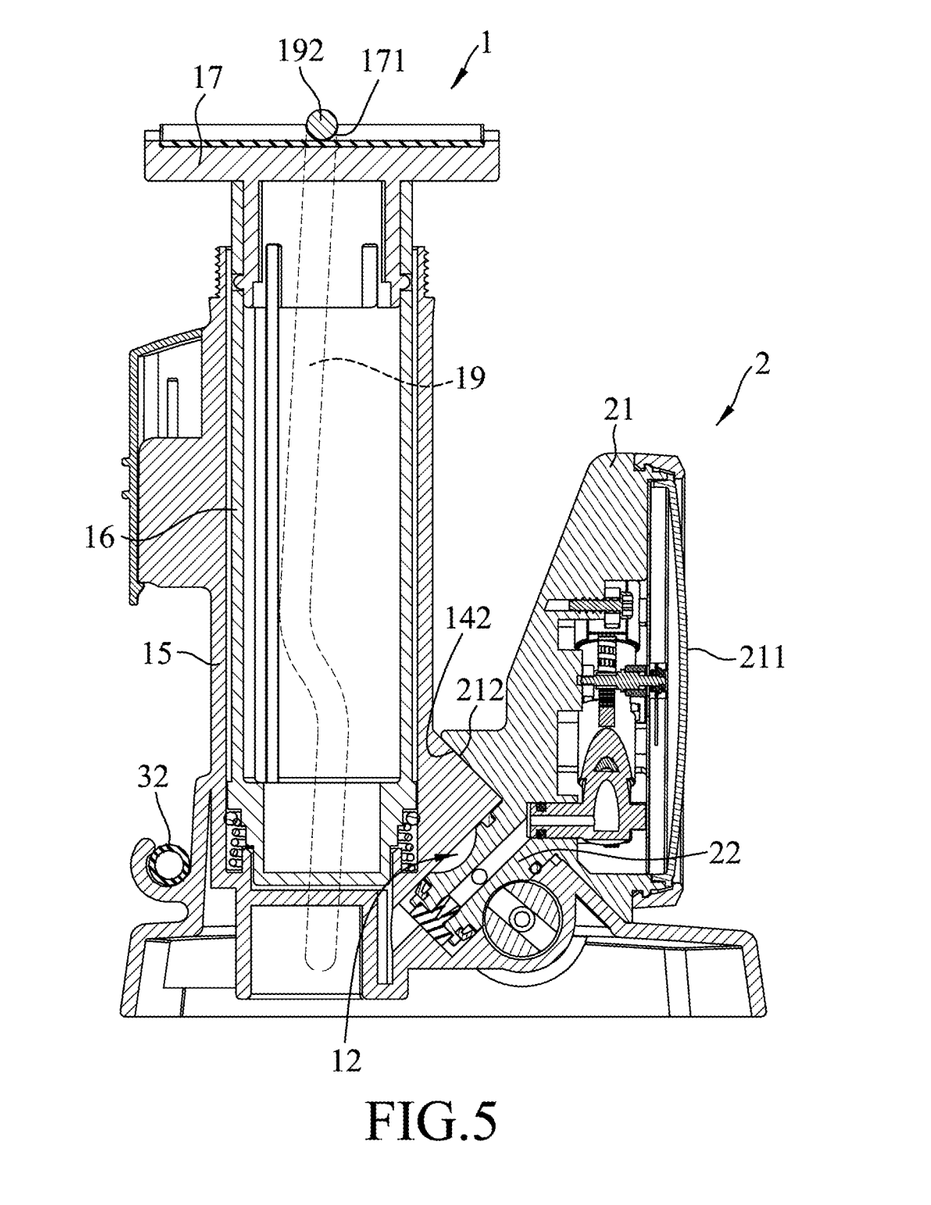
FIG. 5 is a view similar to FIG. 4, but illustrating a pressure gauge unit in a folded position.

It should be noted herein that during use of the air inflation device 100, the angle of the pressure gauge 21 can be adjusted according to the requirement. To adjust the pressure gauge 21, the pressure gauge 21 is simply rotated with the shaft 22 rotating 180° in situ in the air outlet channel 12 and with the second inclined surface 212 rotatable relative to the first inclined surface 142, so that the pressure gauge unit 21 is switchable relative to the inflation unit 1 between a use position and a folded position. In the use position, as shown in FIG. 2, the gauge surface 211 of the pressure gauge 21 extends laterally and horizontally, and faces upward. When the inflation unit 1 is inflating, the user can view the pressure gauge 21 while inflating. In the folded position, as shown in FIG. 5, the gauge surface 211 of the pressure gauge 21 extends vertically upright to reduce the volume of the pressure gauge unit 2 for facilitating storage thereof, and the auxiliary member 19 is rotated relative to the bottom seat 14 toward the cylinder 15 to engage the connecting rod 192 thereof with the engaging groove 171 so as to limit and prevent movement of the pedal plate 17. Finally, the soft tube 32 can be wound and positioned around an outer periphery of the cylinder 15, thereby reducing the volume of the air inflation device 100.

Figure 6:
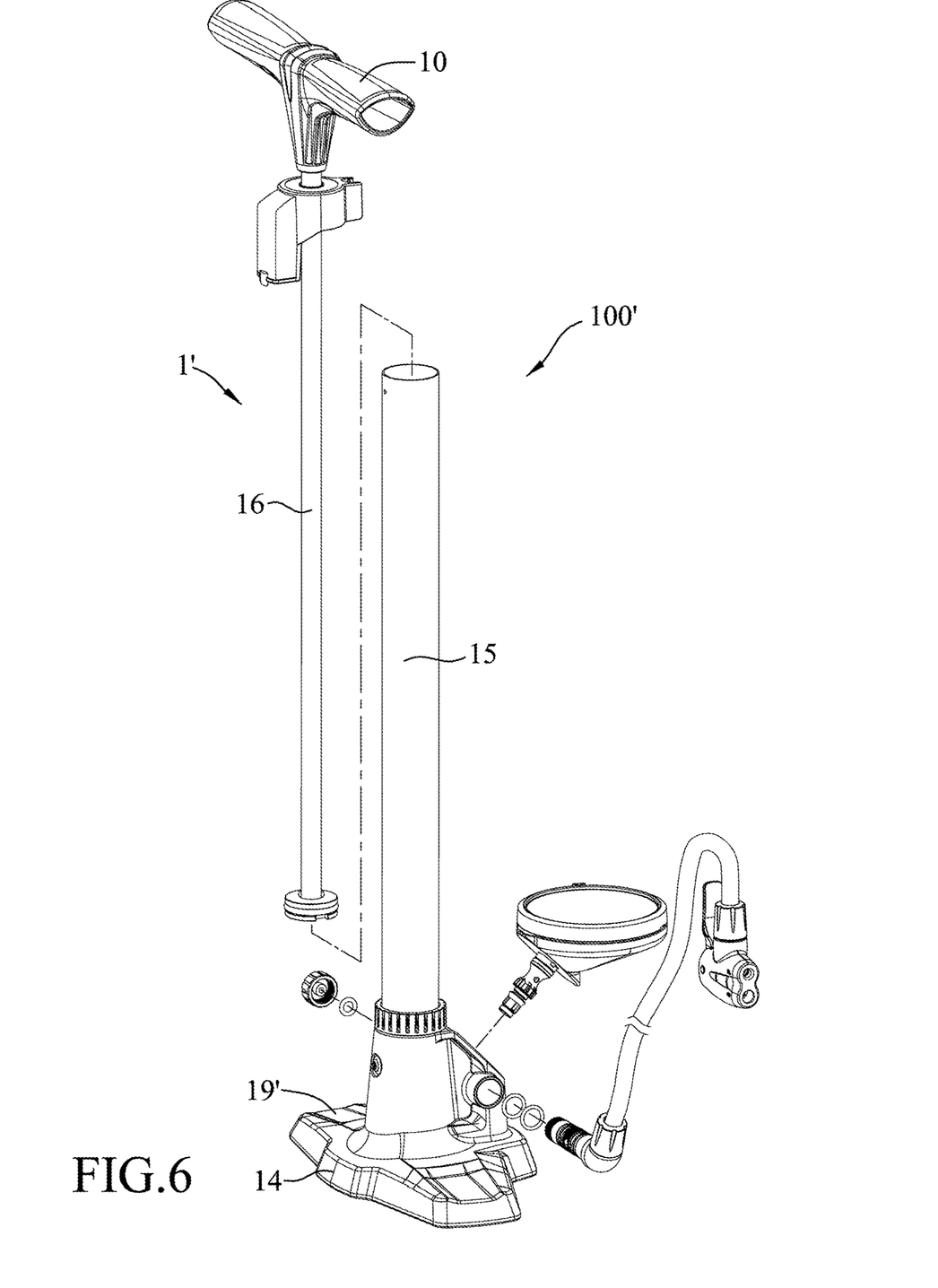
FIG. 6 is a partly exploded perspective view of an air inflation device according to the second embodiment of the present disclosure.
Figure 7:
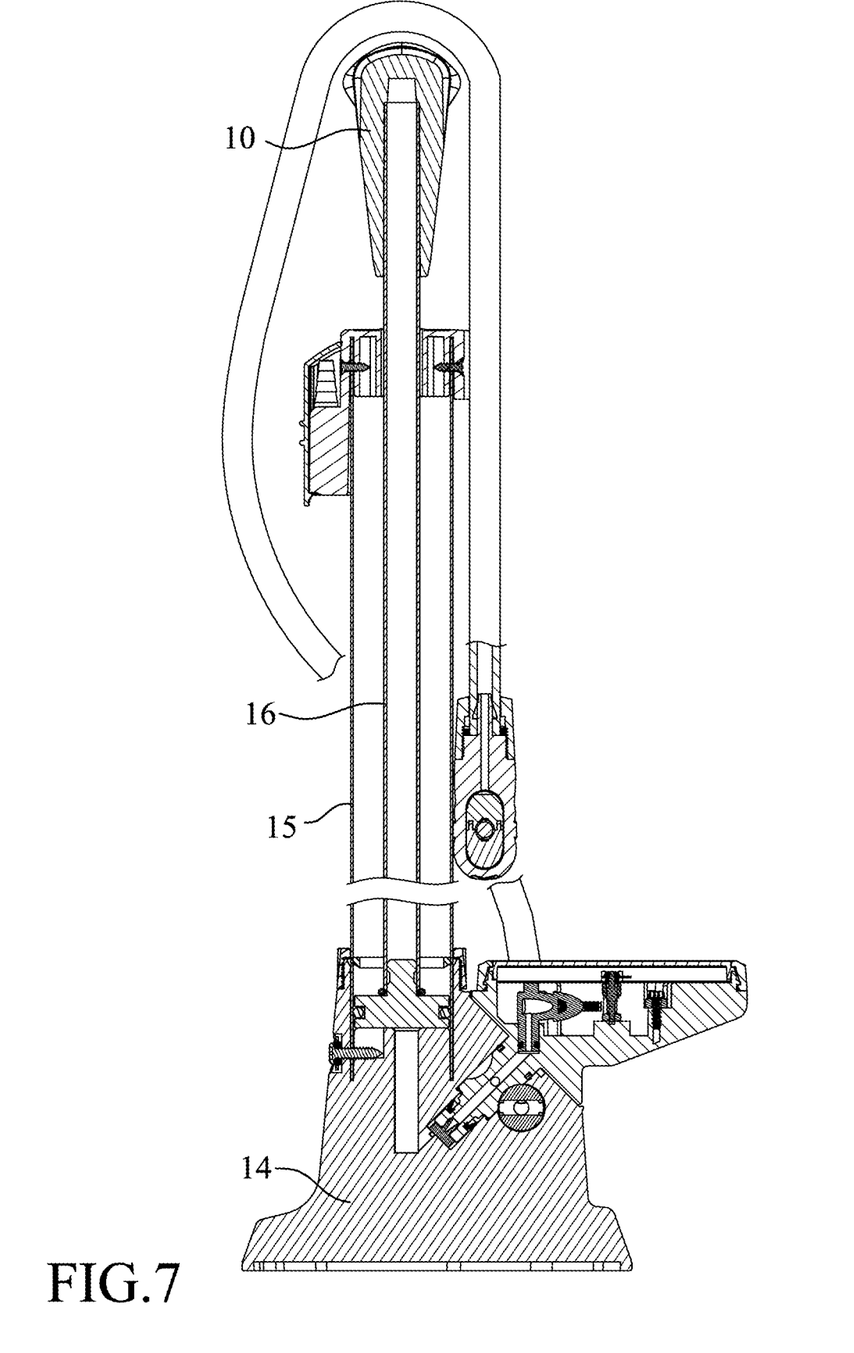
FIG. 7 is a sectional view of the second embodiment.

Referring to FIGS. 6 and 7, the second embodiment of the air inflation device 100' according to this disclosure is shown to be identical to the first embodiment, and differs in that the inflation unit 1' of the second embodiment is hand-operated. The inflation unit 1' of the second embodiment similarly includes the bottom seat 14, the cylinder 15 and the piston rod 16, but further includes a handle 10 disposed on the top end of the piston rod 16. The handle 10 replaces the pedal plate 17 of the first embodiment, and facilitates gripping by the hands of the user during inflation. Further, the elastic member 18 (see FIG. 2) of the first embodiment is omitted herein. The auxiliary member 19' of the second embodiment is configured as a step plate fixedly formed on at least one side of the bottom seat 14 and can permit the bottom seat 14 to be firmly supported on the ground. In use, the step plate or auxiliary member 19' can be stepped on by the user.

In summary, in the air inflation device 100, 100' of this disclosure, with the manifold 31 engaging with the shaft 22, the shaft 22 can be stably positioned in the air outlet channel 12 and cannot be easily detached therefrom, so that the product yield and service life of this disclosure can be improved. Further, through the abutment configuration of the first and second inclined surfaces 142, 212, rotation of the pressure gauge 21 can change the angle of the gauge surface 211 thereof. When the pressure gauge 21 is in the use position, the gauge surface 211 extends horizontally to facilitate viewing of the pressure gauge 21, and the size of the gauge surface 211 can be relatively increased to facilitate reading of the pressure value. When the pressure gauge 21 is in the folded position, the gauge surface 211 extends upright, and will not protrude out of the bottom seat 14, so that the storage space and the packaging volume of this disclosure can be reduced.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An air inflation device comprising:
    an inflation unit having an air outlet channel extending along a first axis, and an insertion channel extending along a second axis transverse to the first axis and partially communicating with said air outlet channel;
    a pressure gauge unit rotatably mounted on said inflation unit and including a pressure gauge, and a shaft extending outwardly from said pressure gauge and inserted into said air outlet channel, said shaft having an annular groove formed in an outer peripheral surface thereof and corresponding to and communicating with said insertion channel; and
    an air guide unit including a manifold inserted into said insertion channel and engaging said annular groove.

2. The air inflation device as claimed in claim 1, wherein said shaft has an axial hole extending along the first axis from a distal end of said shaft that is distal to said pressure gauge to a proximal end of said shaft that is connected to said pressure gauge, and an aperture formed through a base of said annular groove and transverse to and communicating with said axial hole.

3. The air inflation device as claimed in claim 2, wherein said air guide unit further includes a soft tube connected to an end of said manifold that is distal to said insertion channel, and an inflation head mounted on an end of said soft tube that is distal to said manifold, said manifold having a manifold axial hole extending along the second axis from an end of said manifold that is distal to said soft tube to the end of said manifold that is connected to said soft tube, and a perforation extending transversely from said manifold axial hole to an outer peripheral surface of said manifold and corresponding to and communicating with said annular groove.

4. The air inflation device as claimed in claim 1, wherein said annular groove has a concave cross section, said insertion channel has a circular cross section, and said manifold is a round tube engaging said annular groove.

5. The air inflation device as claimed in claim 3, wherein said air guide unit further includes a cap removably connected to an end of said manifold that is distal to said soft tube.

6. The air inflation device as claimed in claim 5, wherein said air guide unit further includes a seal member disposed between said manifold and said cap.

7. The air inflation device as claimed in claim 1, wherein:
    said inflation unit includes a bottom seat having a protruding portion extending upwardly from a top surface thereof, said protruding portion having a first inclined surface, said air outlet channel extending inwardly from said first inclined surface along an axis perpendicular to said first inclined surface;
    said pressure gauge has a gauge surface, and a second inclined surface rotatably abutting against said first inclined surface and forming an included angle with said gauge surface;
    said shaft extends outwardly from said second inclined surface along the axis and is rotatably inserted into said air outlet channel; and
    said second inclined surface is rotatable relative to said first inclined surface so as to switch said pressure gauge unit relative to said inflation unit between a use position, in which said gauge surface of said pressure gauge extends laterally and horizontally, and a folded position, in which said gauge surface of said pressure gauge extends vertically upright.

8. The air inflation device as claimed in claim 7, wherein said second inclined surface is perpendicular to the first axis, has a slope similar to that of said first inclined surface, and forms an angle of 45° with said gauge surface.

9. The air inflation device as claimed in claim 7, wherein said inflation unit further includes a cylinder that defines a chamber, that extends upwardly from said bottom seat and that has a bottom portion surrounded by said protruding portion, and a piston rod movably disposed up and down in said chamber.

10. The air inflation device as claimed in claim 8, wherein said inflation unit further includes a pedal plate disposed on a top end of said piston rod for being stepped on to press down said piston rod, and an elastic member that is disposed in said chamber between a bottom end of said cylinder and a bottom end of said piston rod and that generates a restoring force for driving said piston rod to restore the piston rod to an original position after being pressed downward.

11. The air inflation device as claimed in claim 9, wherein said inflation unit further includes an auxiliary member rotatably mounted on a side of said bottom seat opposite to said first inclined surface, and wherein, when said pressure gauge unit is in the use position, said auxiliary member is rotated relative to said bottom seat away from said cylinder so as to be placed on the ground, and when said pressure gauge unit is in the folded position, said auxiliary member is rotated relative to said bottom seat toward said cylinder so as to engage said pedal plate and limit movement of said pedal plate.

12. The air inflation device as claimed in claim 9, wherein said inflation unit further includes a handle disposed on a top end of said piston rod for pressing down said piston rod.

13. The air inflation device as claimed in claim 12, wherein said inflation unit further includes an auxiliary member fixedly formed on at least one side of said bottom seat for being stepped on.

* * * * *